(12) United States Patent
Mastrangelo

(10) Patent No.: US 7,613,252 B2
(45) Date of Patent: Nov. 3, 2009

(54) INSTALLATION OF DIGITAL DATA RECEIVERS

(75) Inventor: Giuseppe Mastrangelo, Baildon (GB)

(73) Assignee: Pace Plc., Saltaire, Shipley (GB)

( * ) Notice: Subject to any disclaimer, the term of this patent is extended or adjusted under 35 U.S.C. 154(b) by 377 days.

(21) Appl. No.: 09/731,500

(22) Filed: Dec. 7, 2000

(65) Prior Publication Data

US 2001/0005674 A1    Jun. 28, 2001

(30) Foreign Application Priority Data

Dec. 9, 1999    (GB) .................................. 9929013.2

(51) Int. Cl.
*H04L 27/00* (2006.01)
*H03K 9/00* (2006.01)
(52) U.S. Cl. ....................... 375/316; 375/224; 375/229; 375/231; 375/232; 375/345
(58) Field of Classification Search ................. 375/229, 375/230, 231, 232, 316, 346, 350, 224, 345; 455/296, 307; 708/322, 323
See application file for complete search history.

(56) References Cited

U.S. PATENT DOCUMENTS

| | | | |
|---|---|---|---|
| 3,763,359 A | 10/1973 | Cho et al. | |
| 5,577,117 A | 11/1996 | Rabipour et al. | |
| 5,953,373 A * | 9/1999 | Park | 375/229 |
| 5,963,593 A * | 10/1999 | Kaku et al. | 375/233 |
| 5,991,339 A * | 11/1999 | Bazes et al. | 375/232 |
| 6,167,081 A * | 12/2000 | Porter et al. | 375/232 |
| 6,542,540 B1 * | 4/2003 | Leung et al. | 375/232 |

FOREIGN PATENT DOCUMENTS

| | | |
|---|---|---|
| DE | 19501113 C | 4/1996 |
| DE | 19910371 A | 9/1999 |
| EP | 0657997 A | 6/1995 |
| EP | 0798875 A | 10/1997 |

OTHER PUBLICATIONS

Kisel VA: Automatic Correction of Amplitude-Frequency Distortion Within a Given Tolerance Range Telecommunications and Radio Engineering, US, Begell House, Inc. New York, New York vol. 24, No. 11, Nov. 1970 pp. 25-28, XP000761695, ISSN: 0040-2508 Abstract, p. 25, Line 28—Line 36, p. 26, Line 1-Line 17.

* cited by examiner

*Primary Examiner*—Ted M Wang
(74) *Attorney, Agent, or Firm*—Head, Johnson & Kachigian

(57) ABSTRACT

The invention relates to the installation of a broadcast data receiver or similarly installable apparatus. The apparatus and method of the invention includes a means for taking measurements to indicate whether the receiver is installed and operating to provide an optimum service to the user. The Broadcast Data Receiver (BDR) is provided with the processing and control capacity to undertake the comparison of the measured values of the incoming frequency signals at two spaced points and compare with predetermined parameters. If the comparison is acceptable, an indication is provided to the installer but if not the control system for the BDR adjusts of the operation of one or a plurality of components provided as part of a circuit within the BDR until the values are acceptable.

15 Claims, 3 Drawing Sheets

INSTALLATION OF DIGITAL DATA RECEIVERS

CROSS-REFERENCE TO RELATED APPLICATIONS

This application claims priority to GB Application No. 9929013.2 filed 9 Dec. 1999.

BACKGROUND OF THE INVENTION

The invention which is the subject of this application is to provide apparatus and a method of installation of digital data receivers which are used to receive data which is broadcast from a remote location and process the data to generate video, audio and/or auxiliary data, and for the implementation and installation of the receivers at the premises where the invention is to be used.

Conventionally, digital data is broadcast from one or a number of remote locations and is transmitted either via a satellite system, cable network system or terrestrial systems and can be received at a number of premises which are provided with the appropriate data receiving equipment. When the data is received, it is passed to a receiver apparatus which is typically provided with processing means which allow the decoding of the data, processing of the data and the generation of video, audio and/or auxiliary data therefrom.

At the present time, when a customer orders a receiver, and/or wishes to subscribe to service providers, the receiver and data receiving apparatus is required to be installed at the premises of the customer by an installation operator.

As part of the installation procedure, the operator is required to measure the power levels of the incoming signals on which the data is carried to ensure that the levels are within designated parameters and that the installation is correct for the customer before leaving. In order to be able to do this, relatively expensive and complex equipment is required to be used. If the measurements received are not within certain parameters, then the operator may be required to fit attenuators and/or other components to bring the operation of the receiver within the required parameters and this can be time consuming for the operator as it requires the operator to perform a hardware fitting operation at the location of the receiver.

SUMMARY OF THE INVENTION

The aim of the present invention is to provide apparatus and a method for installing a receiver which allows for the reduction in time required for the installation and, furthermore, allows for the installation to be accurate and relatively easily performed by the operator.

In a first aspect of the invention there is provided a method of installation of a receiver to receive broadcast data (BDR) which is broadcast to the location of the receiver, said method comprising, measuring the power level of incoming frequency signals at two predetermined spaced points on the signal band by measuring the content of the AGC (automatic Gain Control) converters within the receiver, providing an amplitude correction filter which can be selectively operated at the (RF) radio frequency input to allow the correction of amplitude variations with frequency, the selective operation of the filter dependent upon the power level measurements.

Thus the invention allows the control system to address the way in which the problems of Intermodulation distortion in a cable network are reduced. In accordance with the invention and without the knowledge of the network cable slope, the broadcast data receiver can adjust its internal gain structure so as to allow relatively weak received signals to be correctly processed.

Typically, the method will allow for the receiver, during the installation procedure, to take into account the power level measurements automatically and make the required corrections as part of the automatic installation procedure. This overcomes the need for the installation operator to use expensive equipment and take time to measure the signals manually.

Typically, in the method, if the high end signal level is greater than the low end signal level, then no linearization is required. However, if the relative power difference is greater than a predetermined level, such as, for example, 10 dB then the linearization circuit can be utilised to adjust the power level so that the incoming signal is within a known power range. In this manner, the method utilises the ability to use the relative signal strength rather than absolute signal strength to install the receiver and therefore avoids the need for the operator to undertake the initial measurements during the installation procedure.

In a further aspect of the invention there is provided a broadcast data receiver apparatus for receiving broadcast digital data which is transmitted and received by the apparatus and passed to the receiver via an RF input from the data carrying network, said receiver including a linearization circuit which can be selectively activated to operate with the receiver control system upon comparison of measurements of the power levels at two predetermined points on the incoming frequency signal and, if the comparison reveals a difference which is greater than a predetermined level, the linearization circuit is activated to adjust the receiver settings during the installation procedure for the BDR at a location at which the same is to be subsequently used.

In one embodiment the linearization circuit is selectively activated automatically by the receiver control system upon specified criteria for activation being met.

In an alternative embodiment the linearization circuit is selectively activated by the receiver installer, upon the installer receiving an indication by visual and/or audible indication means, that the specified criteria for operation of the linearization circuit have been met.

The linearization circuit typically performs cable slope correction internally in the BDR and this can be applied to improve the performance of the BDR at the location of installation. The internal changes performed can include changing the values of the inductors, capacitors and/or resistors to obtain one of a number of equalisation slopes to bring the difference between the high end signal and low end signal within a specific margin. In one use the specific criteria for operation of the linearization circuit is for a difference between the high end and low end signal values greater than 10 dB.

In a yet further aspect of the invention there is provided a method of installation of a receiver to receive digital data which is broadcast to the location of the receiver, said method comprising, measuring the power level of incoming frequency signals at two predetermined spaced points on the signal band, providing means for the comparison of the measurements and if the comparison shows a value within a predetermined parameter an indication is provided to the installer and if the comparison shows a value outwith the predetermined parameter a control system in the receiver adjusts the operation of one or a combination of components within the receiver until the value is within the predetermined parameter.

Typically the extent and level of adjustment is made with reference to at least one algorithm in the control system.

In one embodiment the components which are adjusted are any, or any combination of capacitors, inductors, resistors.

Thus, the present invention provides at the installation of the receiver, for measurements to be taken to indicate whether the receiver is working correctly, but rather that the conventional approach in which the installer is required to perform hardware adjustments to bring the measured values within the acceptable operating parameters, the receiver in accordance with the invention is provided with the processing and control capacity to undertake the comparison of the measured values and compare with predetermined parameters. If the values are acceptable, an indication is provided to the installer but if not the control system for the receiver undertakes adjustments of the operation of one or a plurality of components in the receiver until the values are acceptable. This means that the installer does not have to perform the hardware adjustments and does not have to carry relative complex equipment to perform the installation. The indication of when the receiver is within the predetermined parameters and/or when adjustments are being made can be displayed as on screen messages. Although receivers which are provided to receive data via cable broadcast systems are particularly susceptible, it should be appreciated that the invention can be utilised in any system where it may of potential benefit to the installation procedure.

DESCRIPTION OF DRAWINGS

Specific embodiments of the invention will now be described with reference to the accompanying diagrams, wherein.

DETAILED DESCRIPTION OF THE PREFERRED EMBODIMENT

The apparatus and method as herein described is of particular relevance to receivers which are provided to receive digital data via a cable network where the digital data is transmitted by a broadcaster and to the customer via a cable network system. When a customer subscribes to the service they need to have a receiver and this is typically installed by an operator acting on behalf of the cable network provider. As part of the installation procedure, and as part of the current invention, the installation apparatus and circuitry within the receiver is set to measure the power level of the incoming signal at two predetermined positions, typically at the bottom and top of the band. This measurement is undertaken by measuring the content of the AGC converters. Typically, most receivers require two tuners and at present each has an AGC circuit and for large dynamic range inputs, a switch filter is required. However, by implementing the invention as herein described, only one AGC switch filter is required and, furthermore, the AGC circuit can be simplified. At present most single conversion tuners use switched in filters to overcome problems such as intermodulation problems however these filters are reflective in that they attenuate a signal by reflecting the signal back but this provides a problem in that it degrades the return loss.

As part of the invention a switched equaliser is provided which attenuates the unwanted signals and this has the advantage that the return loss is never degraded.

Figure 1:
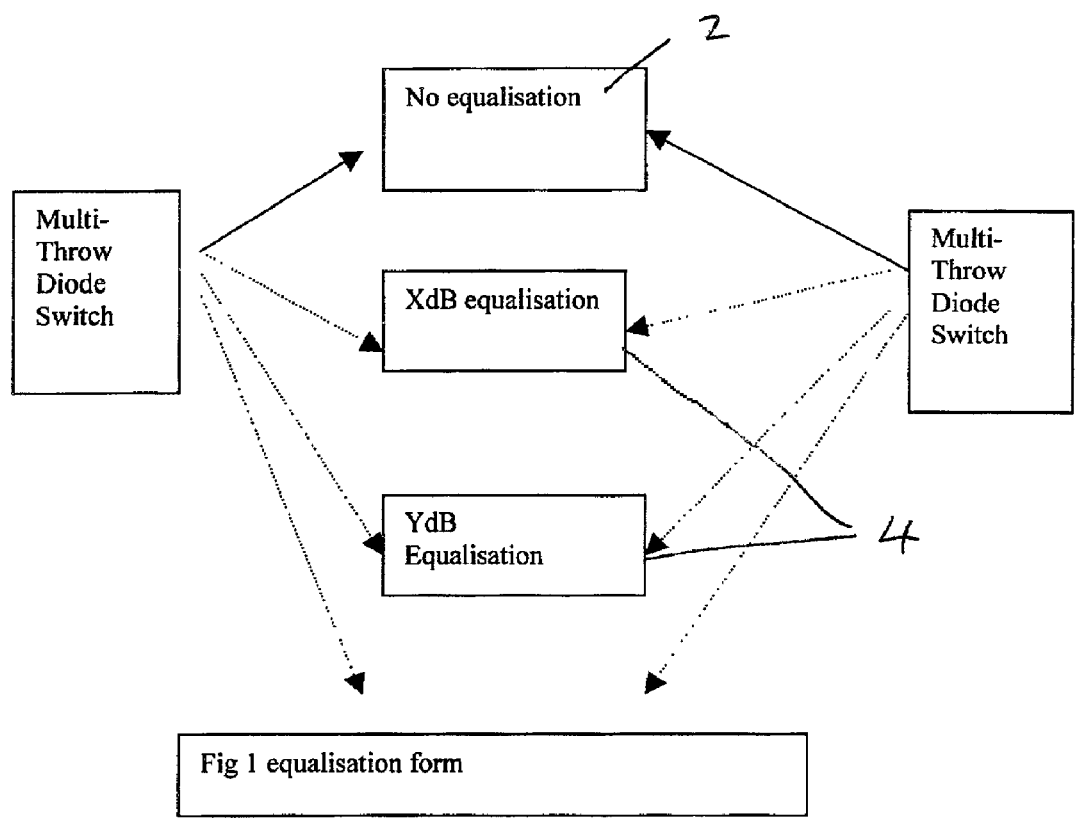
FIG. 1 illustrates a linearization circuit in accordance with one embodiment of the invention.

When the measurements are taken it is found that most cable receivers have problems when changing to high frequencies because of these losses. FIG. 1 shows a simple circuit which is suitable for most cable receivers in that if the measurements taken at the bottom and top of the band indicate that the high end signal level is greater than the low end signal level, then no linearization, 2 is required. If however a relative power difference is greater than a predetermined level such as 10 dB then a switch in linearization circuit 4 is used to equalise either the XdB or YdB as required so that the incoming signal is then within predetermined parameters. Thus, a relative signal strength is used rather than the absolute signal strength to set up the receiver and this displays to the installer if there is a network problem. Furthermore, the receiver can, if there is a problem, utilise circuitry provided in the receiver to take into account the problem.

Figure 2:
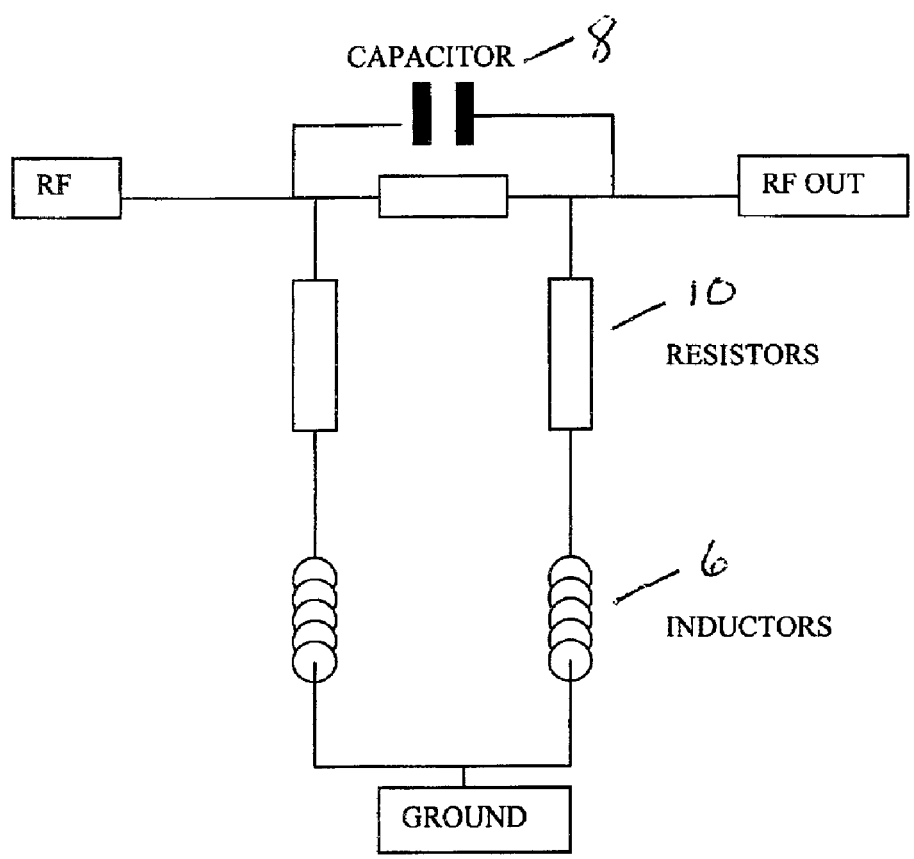
FIG. 2 illustrates the manner in which adjustments can be made if required.

FIG. 2 illustrates how by changing the values of the inductors 6, capacitors 8 and/or resistors 10, varying equalisation slopes can be obtained and the difference between the high end signal and low end signal brought to within the required parameter which therefore means that the receiver is installed to operate within the required parameters.

Figure 3:
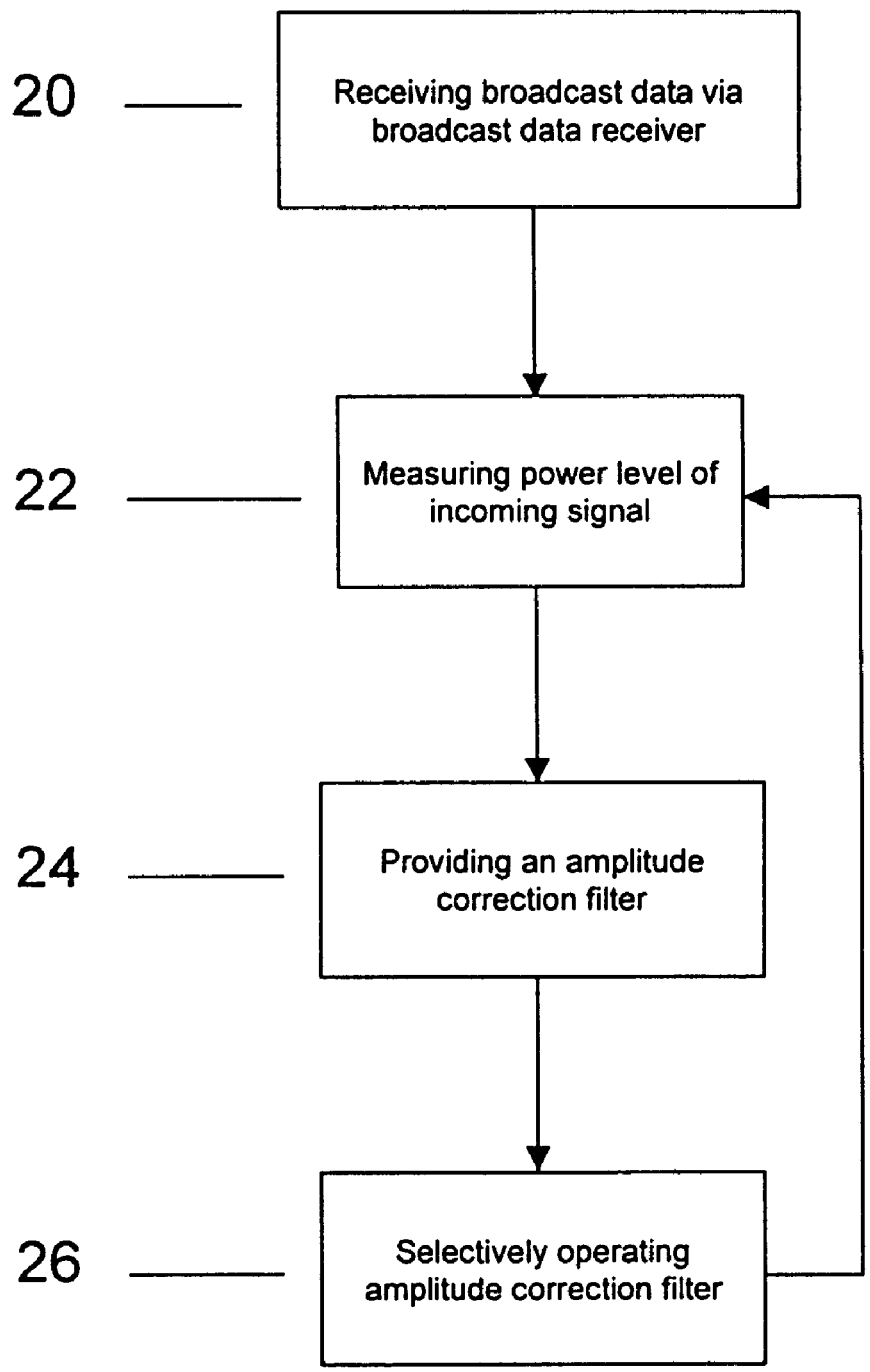
FIG. 3 illustrates the installation steps of a broadcast data receiver.

FIG. 3 illustrates the installation steps of a broadcast data receiver. Firstly, the broadcast data receiver is switched on 20 to allow the same to receive broadcast data. The power level of the incoming signals are measured 22 by measuring the content of the automatic gain control converters, thereby providing 24 an amplitude correction filter. The amplitude correction filter is selectively operated 26 depending on the power level measurements. The steps can be cycled so that the broadcast data receiver is responsive to fluctuations in incoming signal power levels.

Thus at least two cost savings can be achieved using this invention, the material cost of tuners in the Broadcast data receiver (BDR) Materials used and reduction in the time and cost in the installation and/or field service support of the receivers in situ. The material cost saving centres on the performance requirements of the tuner(s) used in the BDR. Here cost is directly related to the performance required and the invention, by adding a circuit to the BDR which, when combined with the ability to then use lower cost tuners, effectively transform the low cost tuners to operate in a manner similar to high performance tuners yet still be significantly cheaper than the cost of high performance tuners.

For example, for a BDR for the USA market a cost difference of $3.00 per tuner could be achieved. This is based on the following current pricing:

Cost of high performance tuner $11.00
Cost of low cost tuner $6.00
Cost of circuit in accordance with the invention $2.00

Turning now to the savings related to the time and cost for installation and field service support. The saving in installation relates to locations in which BDR's are used and where the data is provided via a cable distribution network and where there is a large slope on the cable feed. This large slope is typically due to the length of the cable run. At the present time the installation engineer has to either add slope compensation amplifiers or put in more signal attenuation in order to optimise the cable feed. This process takes time and requires cable feed measuring equipment to be carried by the engineer. This process is also prone to field service problems as performance even after installation may be marginal. In accordance with the present invention the circuit which is introduced performs cable slope correction internally in the BDR and so at installation, the BDR, by using it's own software, can apply the cable slope correction in order to optimise performance without the intervention of the installation engineer. In service, the STB can then monitor performance and change the level of slope correction as the feed slope changes.

Thus it will be clear that the provision of the invention minimises installation time, does not require the installer to measure cable feed slope and, external to the BDR correct that slope, and reduces field service calls relating to changes in the cable feed slope.

It should also be appreciated that as these data carrying network customer loading increases as more customers installed adverse changes in cable feed slope and power levels are expected so that the problem addressed by this invention is likely to increase so that the benefits to be obtained by the invention increase as the same is used with increased frequencies.

It should also be appreciated that although this invention is primarily described with reference to data carried along cable networks the invention can be equally applicable to other data carrying systems such as satellite systems and/or terrestrial network systems.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

The invention claimed is:

1. A method of installation of a receiver to receive broadcast data transmitted from a broadcaster for use to generate audio and/or video at each receiver broadcast continuously to a plurality of locations including the location of the receiver, said method comprising;
    measuring the power level of a broadcast data signal at two predetermined spaced points on the signal band transmitted from a broadcaster by measuring the content of automatic gain control converters having one switch filter relating to said broadcast data signal within the receiver, a portion of the broadcast data signal which content is measured is the data used to generate the audio and/or video at the receiver locations for display at the receiver location for the purpose of viewing the display;
    selectively operating the switch filter on said broadcast data signal to allow the correction of amplitude variations with frequency, the selective operation of the filter dependent upon and responsive to the power level measurements obtained from the signal transmitted from the broadcaster without having knowledge of a training signal cable slope; and
    utilizing, if required, a relative signal strength for installation of said broadcast data receiver instead of an absolute signal strength.

2. A method of installation according to claim 1 wherein during the installation procedure obtaining the power level measurements occurs automatically and is followed by any required correction as part of an automatic installation procedure.

3. A method of installation according to claim 1 wherein two measurements are taken, referred to as the high end signal and the low end signal.

4. A method of installation according to claim 3 wherein if said high end signal level is greater than said low end signal level, then no linearization via the filter is performed.

5. A method of installation according to claim 1 wherein if the difference in power levels between said points is greater than a predetermined level then the power level to said broadcast data receiver is adjusted so that the incoming signal is within a known power range.

6. A broadcast data receiver apparatus for receiving broadcast digital data for use to generate audio and/or video at each receiver which is continuously transmitted to a plurality of locations, received by the apparatus and passed to the receiver via a radio frequency input from the data carrying network, said receiver comprising:
    a linearization circuit comprising a switched equalizer can be selectively activated to operate with a receiver control system upon comparison of measurements of the power levels at two predetermined points on the signal transmitted from the broadcaster passed to the radio frequency input without having knowledge of the network cable slope;
    if the comparison reveals a difference which is greater than a predetermined level, the switched equalizer is activated to adjust the receiver settings to ensure said difference is less than said predetermined level, during an installation procedure for the broadcast data receiver at a location at which the receiver is to be subsequently used; and wherein
    the portion of the broadcast data signal which is measured is the data used to generate the audio and/or video at the receiver locations for display at the receiver location for the purpose of viewing the display.

7. A broadcast data receiver according to claim 6 wherein said receiver is connected to a data supply network in which the data is carried by a cable network.

8. A broadcast data receiver according to claim 7 wherein the linearization circuit is selectively activated automatically by said receiver control system upon specified criteria for activation being met.

9. A broadcast data receiver according to claim 7 wherein said linearization circuit is selectively activated by a receiver installer upon the installer receiving an indication, by visual and/or audio indication means, that specified criteria for operation of said linearization circuit have been met.

10. A broadcast data receiver according to claim 7 wherein said linearization circuit performs cable slope correction internally in said broadcast data receiver and this can be applied to improve the performance of the broadcast data receiver at the location of installation.

11. A broadcast data receiver according to claim 10 receiving a high end signal and a low end signal wherein the internal changes performed can include changing the value of inductors, capacitors and/or resistors to obtain one of a number of equalization slopes to bring the difference between the high end signal and low end signal within a specific margin.

12. A broadcast data receiver according to claim 11 wherein the linearization circuit is selectively activated when the difference between said high end and said low end signal values is greater than 10 dB.

13. A method of installation of a receiver by a user to receive digital data for use to generate audio and/or video at each receiver continuously broadcast to a plurality of locations including the location of the receiver, said method comprising:
    measuring the power level of incoming frequency signals relating to said digital data at two predetermined spaced points on the signal band;
    providing means for the comparison of the measurements without the knowledge of a training signal cable slope, and if the comparison shows a value within a predetermined parameter an indication is provided to the user and if the comparison shows a value out with the predetermined parameter a control system in the receiver adjusts the operation of one or a combination of components within the receiver until the value is within the predetermined parameter; and wherein the data from which the audio and/or video is generated at the receiver locations for display at the receiver location for the purpose of viewing the display is also used for the measurements.

14. A method of installation according to claim 13 wherein said control system adjusts said operation with reference to at least one algorithm in the control system.

15. A method of installation according to claim 13 wherein the components which are adjusted are selected from a group consisting of capacitors, inductors, resistors provided as part of a circuit installed in the broadcast data receiver.

* * * * *

UNITED STATES PATENT AND TRADEMARK OFFICE
CERTIFICATE OF CORRECTION

PATENT NO. : 7,613,252 B2  Page 1 of 1
APPLICATION NO. : 09/731500
DATED : November 3, 2009
INVENTOR(S) : Giuseppe Mastrangelo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Nineteenth Day of October, 2010

David J. Kappos
*Director of the United States Patent and Trademark Office*